United States Patent
Wu

(10) Patent No.: US 11,385,971 B2
(45) Date of Patent: Jul. 12, 2022

(54) ELECTRONIC APPARATUS, SYSTEM AND METHOD CAPABLE OF REMOTELY MAINTAINING THE OPERATION OF ELECTRONIC APPARATUS

(71) Applicant: INNODISK CORPORATION, New Taipei (TW)

(72) Inventor: Chih-Ching Wu, New Taipei (TW)

(73) Assignee: Innodisk Corporation, New Taipei (TW)

( * ) Notice: Subject to any disclaimer, the term of this patent is extended or adjusted under 35 U.S.C. 154(b) by 441 days.

(21) Appl. No.: 16/655,720

(22) Filed: Oct. 17, 2019

(65) Prior Publication Data
US 2021/0026743 A1   Jan. 28, 2021

(30) Foreign Application Priority Data
Jul. 25, 2019   (TW) .................................. 108126432

(51) Int. Cl.
*G06F 11/14*   (2006.01)
*G06F 9/22*    (2006.01)
(Continued)

(52) U.S. Cl.
CPC .......... *G06F 11/1469* (2013.01); *G06F 9/226* (2013.01); *G06F 11/1451* (2013.01);
(Continued)

(58) Field of Classification Search
CPC .............. G06F 11/1415; G06F 11/302; G06F 11/3495; G06F 11/143; G06F 9/226; G06F 11/1469

See application file for complete search history.

(56) References Cited

U.S. PATENT DOCUMENTS 6,901,493 B1 *  5/2005  Maffezzoni ......... G06F 11/1448
                                            714/E11.121
8,255,618 B1 *  8/2012  Borchers ............. G06F 13/1642
                                            710/24

(Continued)

FOREIGN PATENT DOCUMENTS

TW          200416544 A      9/2004
TW          200627140 A      8/2006
(Continued)

*Primary Examiner* — Yolanda L Wilson
(74) *Attorney, Agent, or Firm* — Rosenberg, Klein & Lee

(57) ABSTRACT

The invention provides a system capable of remotely maintaining the operation of electronic apparatus. The system comprises a cloud management platform and at least one electronic apparatus. The electronic apparatus comprises a data storage device and an operating system maintenance device. The data storage device comprises a plurality of flash memories and a controller. The operating system maintenance device comprises a microprocessor and a network communication component. An operating system is installed in the flash memories of the data storage device. When the operating system of the electronic device is abnormal, the operating system maintenance device receives an operating system repairing instruction from the cloud management platform via the network communication component. The microprocessor of the cloud management platform repairs the operating system of the electronic apparatus according to the operating system repairing instruction, so that the operating system of the electronic apparatus can resume normal operation.

22 Claims, 5 Drawing Sheets

(51) Int. Cl.
*G06F 11/30* (2006.01)
*G06F 11/34* (2006.01)
*G06F 13/16* (2006.01)
*G06F 13/42* (2006.01)

(52) U.S. Cl.
CPC ........ G06F 11/302 (2013.01); G06F 11/3495 (2013.01); G06F 13/1668 (2013.01); G06F 13/4282 (2013.01); *G06F 2213/0002* (2013.01); *G06F 2213/0016* (2013.01); *G06F 2213/0026* (2013.01); *G06F 2213/0032* (2013.01)

(56) References Cited

U.S. PATENT DOCUMENTS

| | | | |
|---|---|---|---|
| 8,489,922 B2* | 7/2013 | Matthew | G06F 9/4416 714/47.1 |
| 2002/0053044 A1* | 5/2002 | Gold | G06F 11/1417 714/6.24 |
| 2004/0153724 A1* | 8/2004 | Nicholson | G06F 11/0709 714/E11.133 |
| 2004/0210796 A1* | 10/2004 | Largman | G06F 11/1469 714/E11.133 |
| 2005/0160233 A1* | 7/2005 | Van Doren | G06F 12/0831 711/143 |
| 2007/0050577 A1* | 3/2007 | Kimura | G06F 11/1469 714/E11.122 |
| 2009/0034543 A1* | 2/2009 | Thomas | G06F 11/1415 370/401 |
| 2020/0021552 A1* | 1/2020 | Brogan | H04L 51/20 |
| 2021/0286685 A1* | 9/2021 | Ali | G06F 11/2284 |

FOREIGN PATENT DOCUMENTS

| | | |
|---|---|---|
| TW | 201005645 A | 2/2010 |
| TW | 201624280 A | 7/2016 |

* cited by examiner

ELECTRONIC APPARATUS, SYSTEM AND METHOD CAPABLE OF REMOTELY MAINTAINING THE OPERATION OF ELECTRONIC APPARATUS

This non-provisional application claims priority claim under 35 U.S.C. § 119(a) on Taiwan Patent Application No. 108126432 filed Jul. 25, 2019, the entire contents of which are incorporated herein by reference.

FIELD OF THE INVENTION

The present invention relates to a system and method for maintaining the operation of electronic apparatus, more particularly, a system and method capable of remotely maintaining the operation of electronic apparatus.

BACKGROUND

With the needs of life, unattended electronic devices such as vending machines, advertising machines, monitors, etc. are often seen on the road.

In the past, when the operating system of the electronic apparatus was crashed or damaged, the engineer had to go to the installation location of the electronic apparatus in person to repair the operating system of the electronic device, for example, restarting or restoring the operating system of the electronic apparatus. If the installation location of the electronic apparatus is very remote or the operating systems of a large number of electronic apparatuses are crashed or damaged, it will cause a serious burden on the repairing work of operating system.

Nowadays, the electronic apparatus is often equipped with a network communication module. The remote manager can directly update the internal data of the electronic apparatus or execute one or more specific operations for the electronic apparatus via the network communication module. When the operating system of the electronic apparatus has crashed or damaged, the remote manager will unable to execute any operations for the electronic apparatus, and can only wait for the operating system of the electronic device to be repaired.

For the reason, the present invention will provide a mechanism for remotely maintaining an electronic apparatus, the mechanism of which allows the manager to maintain the operating system of the electronic apparatus at the remote end, so that the manager can easily maintain the operating system of the electronic apparatus without going to the installation location of the electronic apparatus, which will be the objective of the present invention.

SUMMARY

It is one objective of the present invention to provide a system and method capable of remotely maintaining the operation of electronic apparatus, wherein the system comprises a cloud management platform and an electronic apparatus, the electronic apparatus comprises a data storage device and an operation system maintenance device, the data storage device comprises a plurality of flash memories and a controller, the electronic apparatus is installed with an operating system via the flash memories of the data storage device, the operating system maintenance device comprises a microprocessor that is having a network communication function and equipped with an embedded system. When the operating system of the electronic apparatus is abnormal, the operating system maintenance device receives an operating system repairing instruction from the cloud management platform. The microprocessor of the operating system maintenance device executes a repairing task for the operating system of the electronic apparatus according to the operating system repairing instruction, so that the repaired operating system of the electronic apparatus can resume normal operation. Thus, the manager of the electronic apparatus can maintain the operating system of the electronic apparatus via the cloud management platform in a remote end, thereby reducing the burden on the maintenance of the operating system of the electronic apparatus.

It is another objective of the present invention to provide a system and method capable of remotely maintaining the operation of electronic apparatus, when the manager wants to update a firmware of the electronic apparatus, he sends a firmware updating instruction including a firmware updating file to the electronic apparatus by the cloud management platform. After the microprocessor of the operating system maintenance device of the electronic apparatus receives the firmware updating instruction, it will update the firmware of the electronic apparatus by the firmware updating file in the firmware updating instruction, such that the cloud management platform can still perform the updating of the firmware of the electronic apparatus via the operating system maintenance device of the electronic apparatus without the assistance of the operating system, thereby increasing the convenience of updating the firmware of the electronic apparatus.

To achieve the above objective, the present invention provides an electronic apparatus, comprising: a data storage device, comprising a plurality of flash memories and a controller, the controller is connected to the flash memories, wherein the electronic apparatus is installed with an operating system via the flash memories; and an operating system maintenance device, connected to the data storage device, and comprising a microprocessor and a network communication component connected to the microprocessor; wherein, when the operating system of the electronic apparatus is abnormal, the operating system maintenance device receives an operating system repairing instruction from a remote end via the network communication component, and the microprocessor of the operating system maintenance device executes a repairing task for the operating system according to the operating system repairing instruction.

In one embodiment of the present invention, the microprocessor of the operating system maintenance device is equipped with an embedded system used for monitoring an operation condition of the operating system; when the embedded system monitors that the operating system is abnormal, the microprocessor reports an operating system fault message to a cloud management platform, and then the cloud management platform transmit the operating system repairing instruction to the cloud management platform according to the operating system fault message.

In one embodiment of the present invention, wherein the microprocessor further comprises an input and output pin, the electronic apparatus further comprises a motherboard that is provided with a reset pin thereon, the input and output pin is connected to a reset pin; when the operating system maintenance device receives the operating system repairing instruction, the microprocessor of the operating system maintenance device sends a reset signal to the reset pin via the input and output pin to perform a reboot action for the electronic apparatus.

In one embodiment of the present invention, wherein the flash memories are formed with a data sector, the data sector comprises a first data partition and a second data partition, the operating system is installed in the first data partition, the second data partition stores an operating system restoring file; when the operating system maintenance device receives the operating system repairing instruction, the microprocessor of the operating system maintenance device requests that the controller of the data storage device restores the operating system in the first data partition by the operating system restoring file in the second data partition; after the operating system has been repaired, the microprocessor of the operating system maintenance device sends the reset signal to the reset pin via the input and output pin to perform the reboot action for the electronic apparatus.

In one embodiment of the present invention, the controller comprises a firmware, the firmware defines an operating system restoring process; when the operating system maintenance device receives the operating system repairing instruction, the microprocessor of the operating system maintenance device sends an operating system restoring instruction to the controller, the controller executes the operating system restoring process to restore the operating system in the first data partition by the operating system restoring file in the second data partition.

In one embodiment of the present invention, the first data partition further stores at least one specific data; when the operating system is operating normally, the controller will back up the specific data in the first data partition to the second data partition; afterwards, when the damaged operating system has been repaired, the controller copies the previously backed up specific data from the second data partition to the first data partition.

In one embodiment of the present invention, the microprocessor is a chip with network communication function, the network communication component is integrated in the microprocessor.

In one embodiment of the present invention, further comprises a circuit board, the flash memories and the controller of the data storage device and the microprocessor and the network communication component of the operating system maintenance device are disposed on the circuit board.

In one embodiment of the present invention, further comprises a first circuit board and a second circuit board, the flash memories and the controller of the data storage device are disposed on the first circuit board, and the microprocessor and the network communication component of the operating system maintenance device are disposed on the second circuit board.

In one embodiment of the present invention, wherein the microprocessor of the operating system maintenance device is connected to the controller of the data storage device via a connection line conforming to RS232 specification, UART specification, or I2C specification.

In one embodiment of the present invention, wherein the data storage device is a data storage device having a SATA transmission interface, a PCIe transmission interface or an M.2 transmission interface.

In one embodiment of the present invention, wherein the network communication component is a WiFi communication component, an Ethernet communication component, or a 3G, 4G or 5G communication component.

The present invention further provides a system capable of remotely maintaining the operation of electronic apparatus, comprising: a cloud management platform; and at least one electronic apparatus comprising a data storage device and an operating system maintenance device connected to the data storage device, wherein the data storage device comprises a plurality of flash memories and a controller, the controller is connected to the flash memories, the electronic apparatus is installed with an operating system via the flash memories, the operating system maintenance device comprises a microprocessor and a network communication component, the microprocessor is connected to the network communication component, the operating system maintenance device is connected to the cloud management platform via the network communication component; wherein, when the operating system of the electronic apparatus is abnormal, the operating system maintenance device receives an operating system repairing instruction from the cloud management platform via the network communication component, and the microprocessor of the operating system maintenance device executes a repairing task for the operating system according to the operating system repairing instruction.

The present invention further provides a method capable of remotely maintaining the operation of electronic apparatus, which is applied to a system capable of remotely maintaining the operation of electronic apparatus, the system comprises a cloud management platform and at least one electronic apparatus, the electronic apparatus comprises a data storage device and an operating system maintenance device, the data storage device comprises a plurality of flash memories and a controller, the electronic apparatus is installed with an operating system via the flash memories of the data storage device, the operating system maintenance device comprises a microprocessor that is having a network communication function and equipped with an embedded system, steps of the method capable of remotely maintaining the operation of electronic apparatus comprising: requiring the operating system maintenance device to communicate with the cloud management platform; sending an operating system fault message to the cloud management platform by the microprocessor of the operating system maintenance device when the microprocessor of the operating system maintenance device monitors that the operating system of the electronic apparatus is abnormal; transmitting an operating system repairing instruction to the operating system maintenance device by the cloud management platform according to the operating system fault message; and executing a repairing process for the operating system of the electronic apparatus by the microprocessor of the operating system maintenance device after receiving the operating system repairing instruction from the cloud management platform.

In one embodiment of the present invention, the step of the microprocessor of the operating system maintenance device executing the repairing process for the operating system of the electronic apparatus comprising: sending a reset signal to a reset pin on a motherboard of the electronic apparatus to perform a reboot action for the electronic apparatus.

In one embodiment of the present invention, wherein the flash memories are formed with a data sector, the data sector comprises a first data partition and a second data partition, the operating system is installed in the first data partition, the second data partition stores an operating system restoring file, the step of the microprocessor of the operating system maintenance device executing the repairing process for the operating system of the electronic apparatus comprising: requiring the controller of the data storage device to restore the operating system in the first data partition by the operating system restoring file in the second data partition; and sending a reset signal to a reset pin on a motherboard of the electronic apparatus to perform a reboot action for the electronic apparatus.

In one embodiment of the present invention, the step of requiring the controller of the data storage device to restore the operating system in the first data partition by the operating system restoring file in the second data partition comprising: sending an operating system restoring instruction to the controller by the microprocessor; and executing an operating system restoring process by the controller according to the operating system restoring instruction to restore the operating system in the first data partition by the operating system restoring file in the second data partition.

In one embodiment of the present invention, wherein the first data partition further stores at least one specific data related with the operation of the operating system; when the operating system is operating normally, the controller will back up the specific data in the first data partition to the second data partition; afterwards, when the damaged operating system has been repaired, the controller copies the previously backed up specific data from the second data partition to the first data partition.

In one embodiment of the present invention, further comprising the following steps: sending a firmware updating instruction including a firmware updating file to the operating system maintenance device by the cloud management platform; and updating a firmware of the controller of the data storage device after the microprocessor of the operating system maintenance device receiving the firmware updating instruction.

DETAILED DESCRIPTION OF THE PREFERRED EMBODIMENTS

Figure 1:
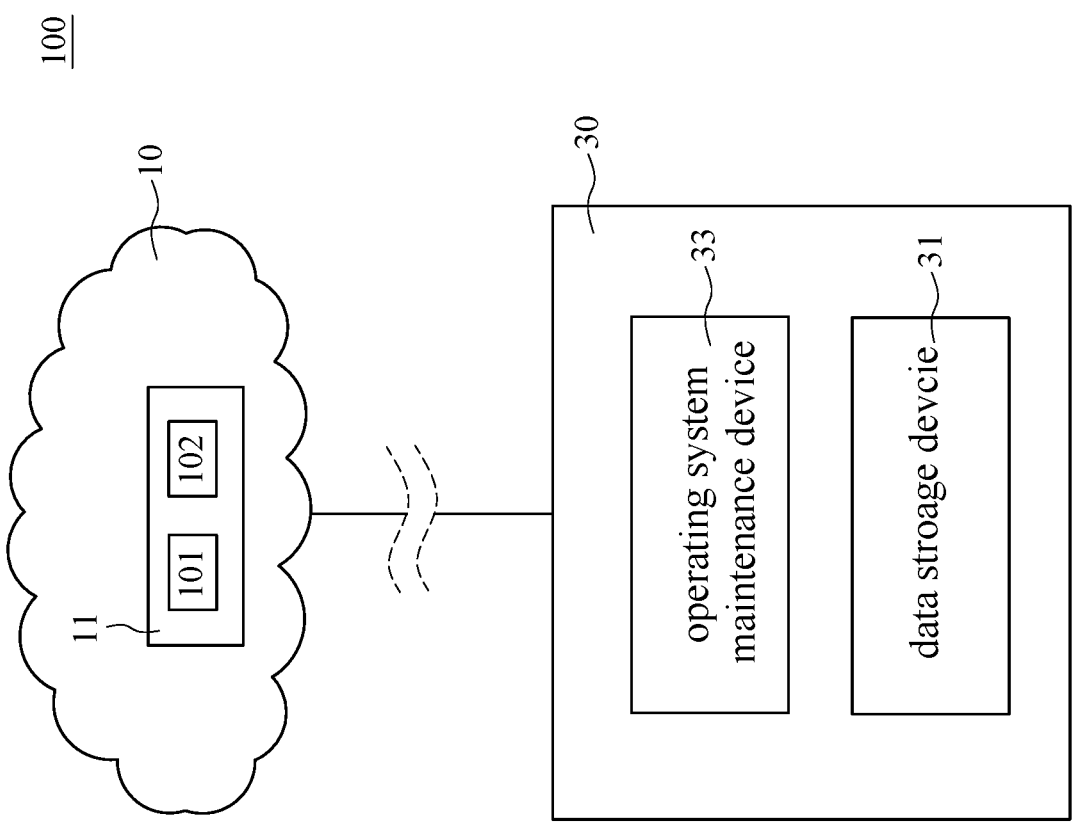
FIG. 1 is an architecture diagram of a system of the present invention, wherein the system is capable of remotely maintaining the operation of an electronic apparatus.
Figure 2:
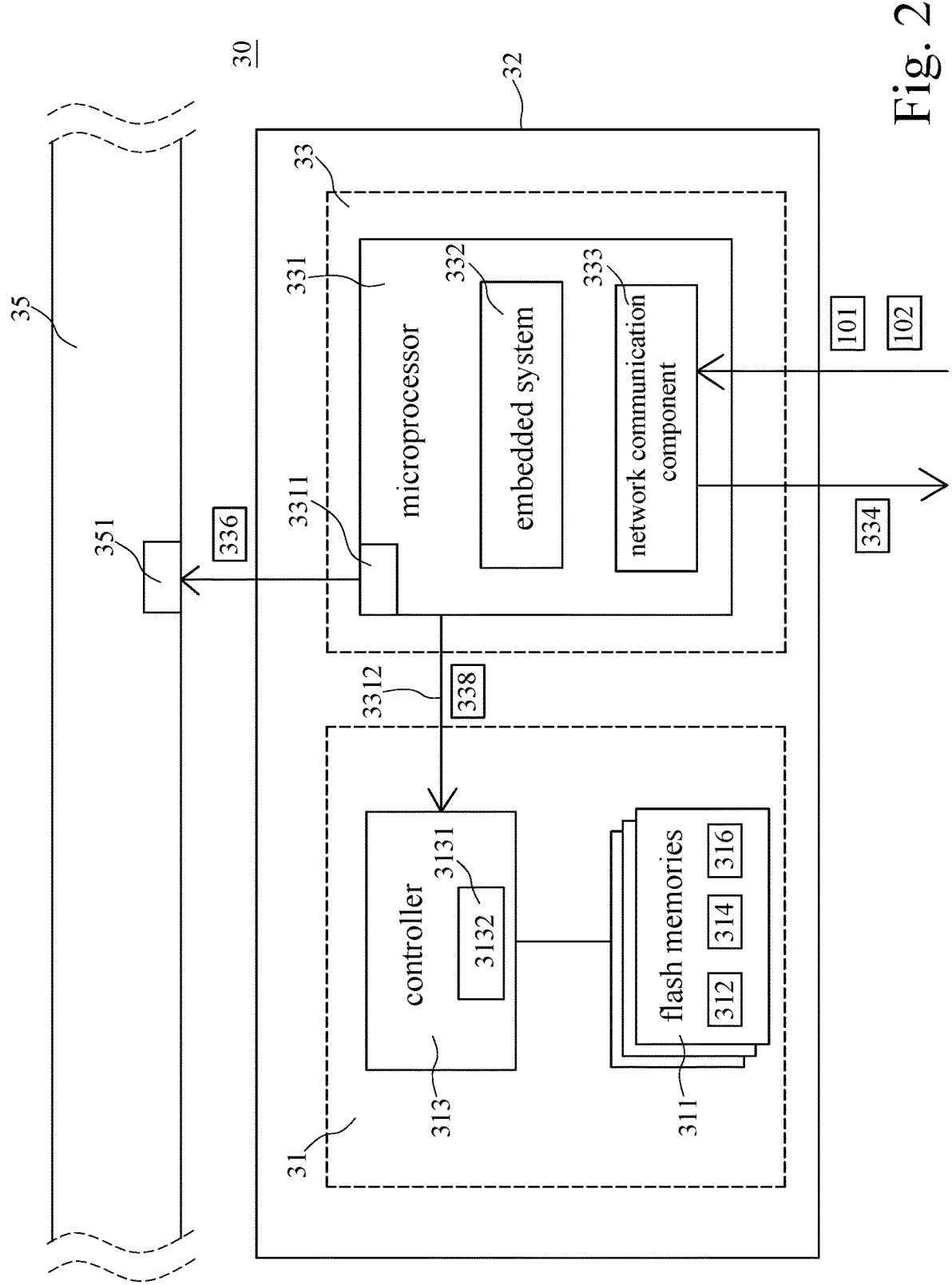
FIG. 2 is a circuit diagram of the electronic apparatus according to one embodiment of the present invention.

Referring to FIG. 1 and FIG. 2, there are shown an architecture diagram of a system of the present invention, and a circuit diagram of the electronic apparatus according to one embodiment of the present invention, respectively, wherein the system of the present invention is capable of remotely maintaining the operation of electronic apparatus. As shown in FIG. 1 and FIG. 2, the system 100 comprises a cloud management platform 10 and at least one electronic apparatus 30. The electronic apparatus 30 is a vending machine, an advertising machine, a monitor, a POS (Point of Sale) machine, a monitor, or other equipment with specific purpose.

The electronic apparatus 30 comprises a data storage device 31 and an operating system maintenance device 33. The data storage device 31 may be a solid state disk (SSD) having a SATA transmission interface, a PCIe transmission interface or an M.2 transmission interface, or other storage device capable of memorizing data. The data storage device 31 comprises a plurality of flash memories 311 and a controller 313. The controller 313 is connected to the flash memories 311. The electronic apparatus 30 is installed with an operating system 312 via the flash memories 311 of the data storage device 31.

The operating system maintenance device 33 comprises a microprocessor 331. In one embodiment of the present invention, the microprocessor 331 is a chip with network communication function, for example, a network communication component 333 is integrated in the microprocessor 331. In another embodiment of the present invention, the microprocessor 331 and the network communication component 333 are independent components, respectively, and the microprocessor 331 is connected to the network communication component 333. Besides, the microprocessor 331 is equipped with an embedded system 332, which is an architecture system of Linux or RTOS (such as TinyOS) and is stored in non-volatile memories (NVMs). The microprocessor 331 of the operating system maintenance device 33 monitors the operation condition of the operating system 312 via the embedded system 332, and reports the operation condition of the operating system 312 to the cloud management platform 10. The network communication component 333 is a WiFi communication component, an Ethernet communication component, a 3G, 4G or 5G communication component, or other networkable communication component. The operating system maintenance device 33 is communicated with the cloud management platform 10 via the network communication component 333. Furthermore, the microprocessor 331 of the operating system maintenance device 33 is connected to the controller 313 of the data storage device 31 via a connection line 3312. The connection line 3312 may be a connection line conforming to RS232 specification, UART specification, or I2C specification.

When the embedded system 332 of the microprocessor 331 monitors that the operating system 312 of the electronic apparatus 30 is abnormal and therefore is unable to work, for example, the operating system 312 crashes, or the file data of the operating system 312 is damaged, the microprocessor 331 will report an operating system fault message 334 to the cloud management platform 10. After the manager of the cloud management platform 10 receives the operating system fault message 334, it will know that the operating system 312 of the electronic apparatus 30 is unable to work, and then generate an operating system repairing instruction 101 by the use of a management interface 11 and transmit the operating system repairing instruction 101 to the electronic apparatus 30. In the present invention, the management interface 11 may be an application programming interface in WEB form (WEB App).

The electronic apparatus 30 further comprises a motherboard 35, which is provided with a reset pin 351 thereon. The microprocessor 331 further comprises an input and output pin 3311. The microprocessor 331 is electrically connected to the reset pin 351 via the input and output pin 3311. After the operating system maintenance device 33 receives the operating system repairing instruction 101 via the network communication component 333, the microprocessor 331 of the operating system maintenance device 33 begins to execute the repairing process for the operating system 312 of the electronic apparatus 30.

When the microprocessor 331 of the operating system maintenance device 33 executes the repairing process for the operating system 312 of the electronic apparatus 30, if the embedded system 332 of the microprocessor 331 monitors that the operating system 312 is just a general crash, the microprocessor 331 sends a reset signal 336 to the reset pin 351 via the input and output pin 3311 to perform a reboot action for the electronic apparatus 30 according to the reset signal 336, so that the operating system 312 can be restarted to resume normal operation.

Figure 3:
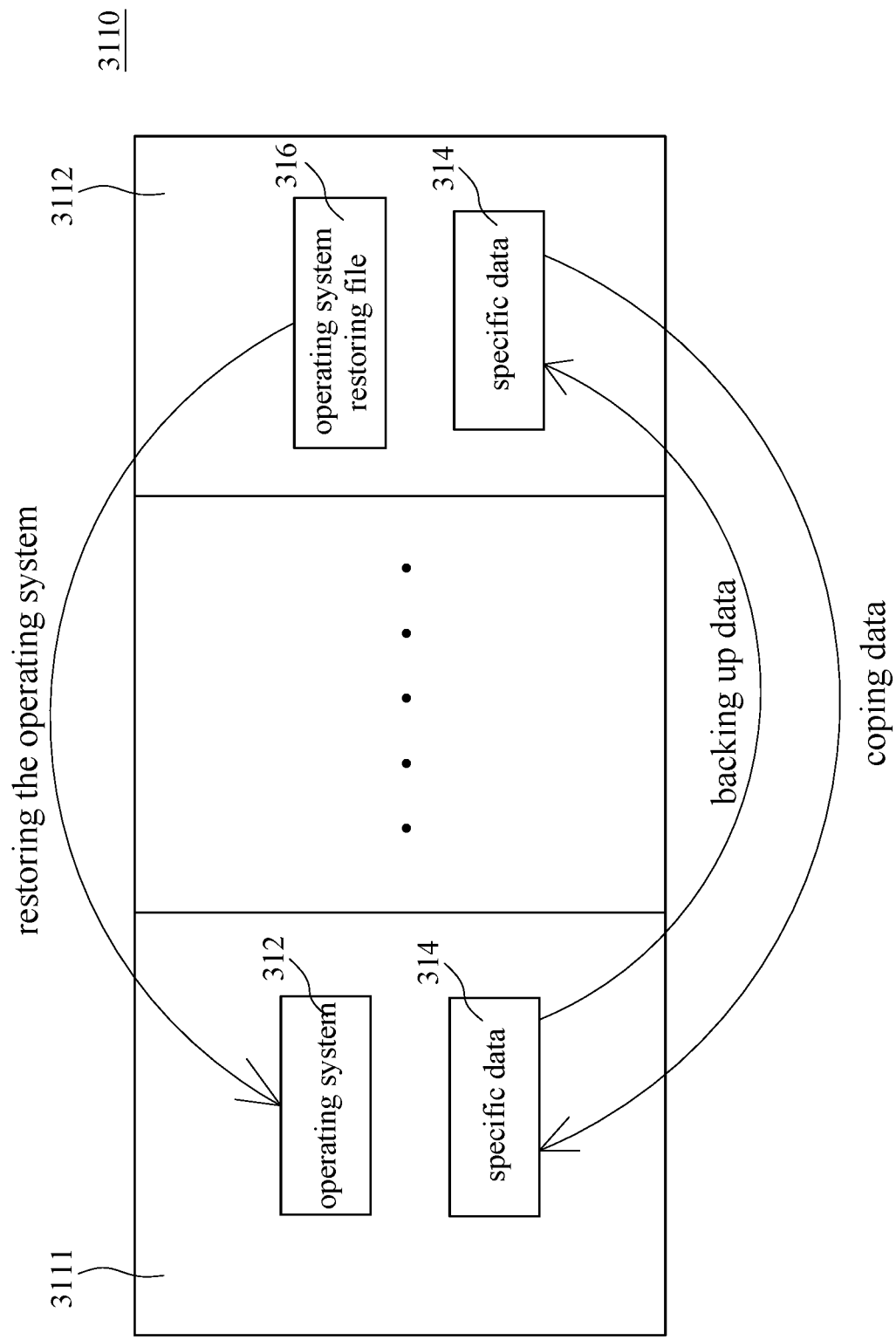
FIG. 3 is a schematic diagram of a data sector formed by a flash memory of a data storage device of an electronic device of the present invention.

Further, the flash memories 311 are formed with a data sector 3110, as shown in FIG. 3. A first data partition 3111 and a second data partition 3112 are cut out from the data sector 3110. The operating system 312 is installed in the first data partition 3111. The second data partition 3112 stores an operating system restoring file 316. The controller 313 comprises a firmware 3131, which defines an operating system restoring process 3132. When the microprocessor 331 of the operating system maintenance device 33 executes the repairing process for the operating system 312 of the electronic apparatus 30, if the embedded system 332 of the microprocessor 331 monitors that part of file data of the operating system 312 has been damaged, the microprocessor 331 sends an operating system restoring instruction 338 to the controller 313 via the connection line 3312. After the controller 313 receives the operating system restoring instruction 338, it will execute the operating system restoring process 3132 to restore the operating system 312 in the first data partition 3111 by the use of the operating system restoring file 316 in the second data partition 3112. After the operating system 312 has been repaired, the microprocessor 331 further sends the reset signal 336 to the reset pin 351 to perform the reboot action for the electronic apparatus 30. Accordingly, the repaired operating system 312 will be restarted and resume normal operation, again.

In one embodiment of the present invention, the first data partition 3111 of the data sector 3110 further stores at least one specific data 314, such as system parameters, data of application programs, and the like, related with the operation of the operating system 312. When the operating system 312 is operating normally, the controller 313 will actively back up the specific data 314 in the first data partition 3111 to the second data partition 3112. Afterwards, if the controller 313 executes the operating system restoring process 3132 due to the damage of the operating system 312 in the first data partition 3111, the previously backed up specific data 314 is also copied from the second data partition 3112 back to the first data partition 3111 except for restoring the operating system 312 in the first data partition 3111 by using the operating system restoring file 316 in the second data partition 3112. Accordingly, the controller 313 copies the previously backed up specific data 314 from the second data partition 3112 back to the first data partition 3111 during the restoring process of the operating system 312, the repaired operating system 312 can resume to the operation state before the failure by the use of the specific data 314 so that the operating system 312 can re-operate normally.

Figure 4:
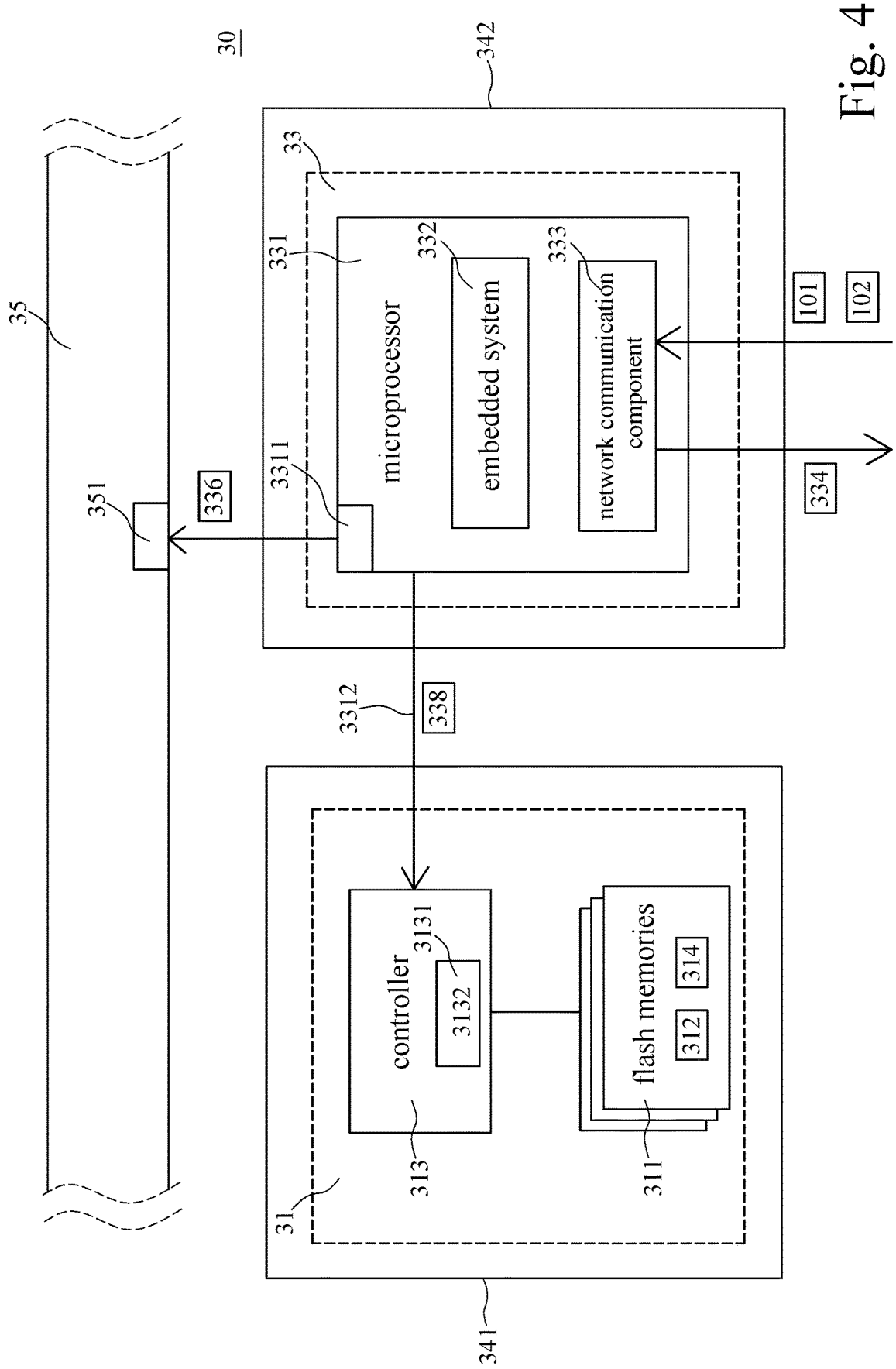
FIG. 4 is a circuit diagram of the electronic apparatus according to another embodiment of the present invention.

One embodiment of the present invention, as shown in FIG. 2, the data storage device 31 and the operating system maintenance device 33 can be integrated into a single device, and the electronic components of the data storage device 31 and the operating system maintenance device 33 are all disposed on the same circuit board. For example, the flash memories 311, the controller 313, the microprocessor 331, the network communication component 333 are all disposed on a circuit board 32. Another embodiment of the present invention, as shown in FIG. 4, the data storage device 31 and the operating system maintenance device 33 are separate devices, and the electronic components of the data storage device 31 and the operating system maintenance device 33 are respectively disposed on different circuit boards. For example, the flash memories 311 and the controller 313 of the data storage device 31 are disposed on a first circuit board 341, and the microprocessor 331 and the network communication component 333 of the operating system maintenance device 33 are disposed on a second circuit board 342.

In the past, the firmware updating of the electronic apparatus must be performed in the operating environment of the operating system, and needs to assist by the operating system. On the contrary, when the cloud management platform 10 wants to update the firmware 3131 of the electronic apparatus 30, it will send a firmware updating instruction 102 including a firmware updating file to one or more electronic apparatuses 30. After receiving the firmware updating instruction 102, the microprocessor 331 of the operating system maintenance device 33 of the electronic apparatus 30 executes a firmware updating process for the controller 313 to update the firmware 3131 of the controller 313. Thus, the cloud management platform 10 can still perform the firmware updating of the electronic apparatus 30 via the operating system maintenance device 33 without the assistance of the operating system 312, thereby increasing the convenience of updating the firmware 3131 of the electronic apparatus 30.

As the above described, the manager of the cloud management platform 10 can easily maintain the operating system 312 of the electronic apparatus 30 and update the firmware 3131 of the electronic apparatus 30 without going to the installation location of the electronic apparatus 30. When the operating system 312 of the electronic apparatus 30 is abnormal, the manager of the cloud management platform 10 can remotely request the operating system maintenance device 33 to repair the operating system 312 of the electronic apparatus 30, so that the operating system 312 of the electronic apparatus 30 can resume normal operation.

Figure 5:
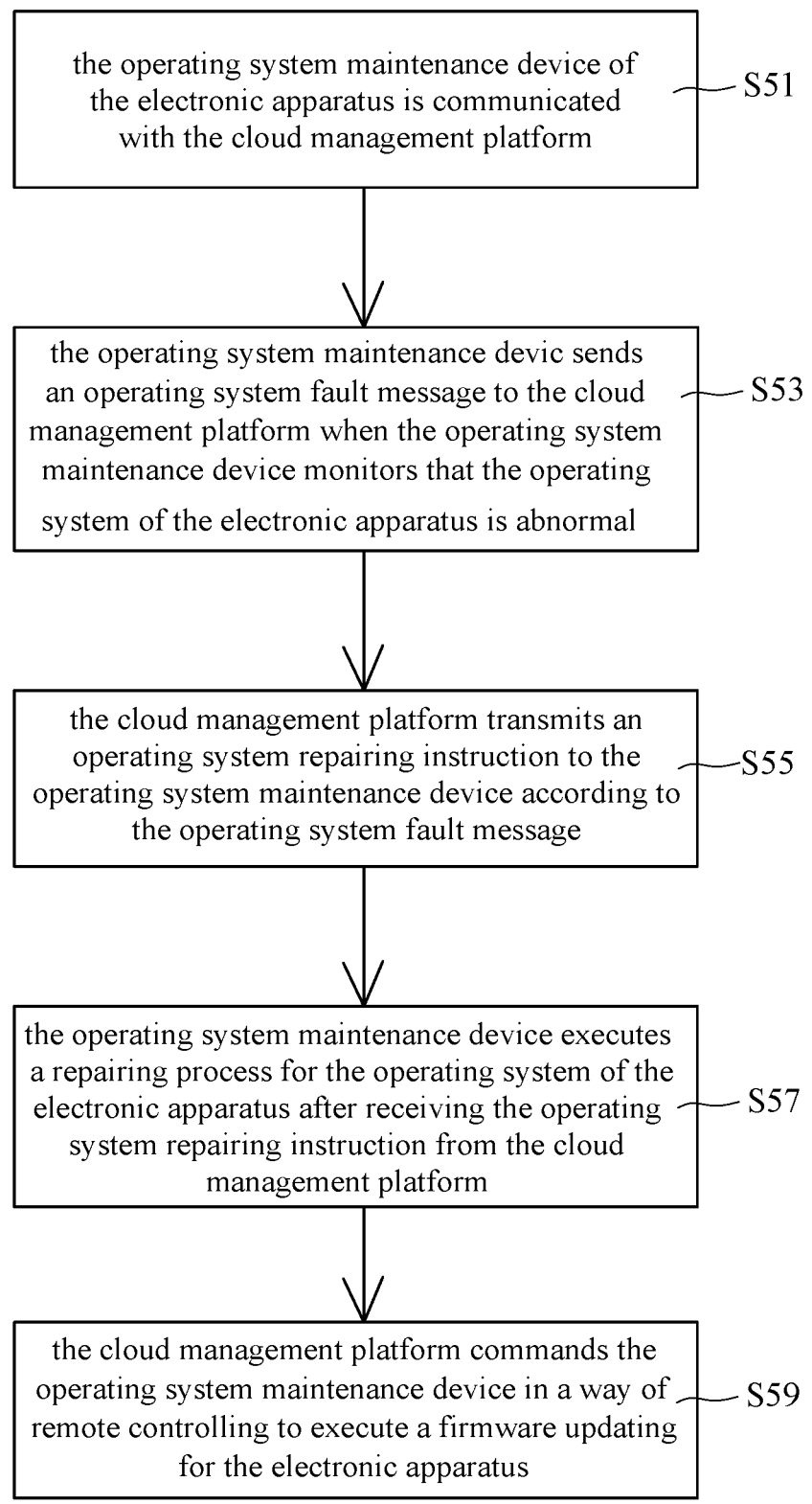
FIG. 5 is a flowchart of a method capable of remotely maintaining the operation of electronic apparatus of the present invention.

Referring to FIG. 5, there are shown a flowchart of a method capable of remotely maintaining the operation of electronic apparatus of the present invention. As shown in FIG. 5, firstly, in Step S51, the operating system maintenance device 33 of the electronic apparatus 30 is communicated with the cloud management platform 10 via the network communication component 333. In Step S53, the microprocessor 331 of the operating system maintenance device 33 monitors that the operating system 312 of the electronic apparatus 30 is abnormal, it will send an operating system fault message 334 to the cloud management platform 10. In Step S55, when the manager of the cloud management platform 10 receives the operating system fault message 334, it will generate an operating system repairing instruction 101 by the use of a management interface 11 and transmit the operating system repairing instruction 101 to the electronic apparatus 30. In Step S57, after the operating system maintenance device 33 receives the operating system repairing instruction 101 from the cloud management platform 10, the microprocessor 331 of the operating system maintenance device 33 executes a repairing process for the operating system 312 of the electronic apparatus 30.

In the repairing process for the operating system 312 of the electronic apparatus 30, if the embedded system 332 of the microprocessor 331 monitors that the operating system 312 is just a general crash, the microprocessor 331 sends a reset signal 336 to the reset pin 351 via the input and output pin 3311 to perform a reboot operation for the electronic apparatus 30 according to the reset signal 336, so that the operating system 312 can be restarted.

In the repairing process for the operating system 312 of the electronic apparatus 30, if the embedded system 332 of the microprocessor 331 monitors that part of file data of the operating system 312 has been damaged, the microprocessor 331 sends an operating system restoring instruction 338 to the controller 313. After the controller 313 receives the operating system restoring instruction 338, it will execute the operating system restoring process 3132 to restore the operating system 312 in the first data partition 3111 by the use of the operating system restoring file 316 in the second data partition 3112. After the operating system 312 has been repaired, the microprocessor 331 sends the reset signal 336 to the reset pin 351 on the motherboard 35 of the electronic apparatus 30 to perform a reboot action for the electronic apparatus 30. Accordingly, the repaired operating system 312 will be restarted to resume normal operation, again. Besides, when the operating system 312 is operating normally, the specific data 314 related with the operation of the operating system 312 may be backed up from the first data partitioning area 3111 to the second data partitioning area 3112. When the damaged operating system 312 has been repaired, the controller 313 copies the previously backed up specific data 314 from the second data partition 3112 back to the first data partition 3111. The repaired operating system 312 is able to resume to the operation state before the failure by the use of the specific data 314 so that the operating system 312 can re-operate normally.

The method of the present invention further comprises a Step S59. In Step S59, the cloud management platform 10 commands the operating system maintenance device 33 in a way of remote controlling to execute a firmware updating for the electronic apparatus 30. Performing Step S59, the cloud management platform 10 in remote end sends a firmware updating instruction 102 including a firmware updating file to the operating system maintenance device 33 of the electronic apparatuses 30. After receiving the firmware updating instruction 102, the microprocessor 331 of the operating system maintenance device 33 will update the firmware 3131 of the controller 313 of the data storage device 31 by the firmware updating file of the firmware updating instruction 102.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. An electronic apparatus, comprising:
a data storage device, comprising a plurality of flash memories and a controller, the controller is connected to the flash memories, wherein the electronic apparatus is installed with an operating system via the flash memories; and
an operating system maintenance device, connected to the data storage device, and comprising a microprocessor and a network communication component connected to the microprocessor;
wherein, when the operating system of the electronic apparatus is abnormal, the operating system maintenance device receives an operating system repairing instruction from a remote end via the network communication component, and the microprocessor of the operating system maintenance device executes a repairing task for the operating system according to the operating system repairing instruction;
wherein the microprocessor of the operating system maintenance device is equipped with an embedded system used for monitoring an operation condition of the operating system; when the embedded system monitors that the operating system is abnormal, the microprocessor reports an operating system fault message to a cloud management platform, and then the cloud management platform transmits the operating system repairing instruction to the operating system maintenance device according to the operating system fault message.

2. The electronic apparatus according to claim 1, wherein the microprocessor further comprises an input and output pin, the electronic apparatus further comprises a motherboard that is provided with a reset pin thereon, the input and output pin is connected to a reset pin; when the operating system maintenance device receives the operating system repairing instruction, the microprocessor of the operating system maintenance device sends a reset signal to the reset pin via the input and output pin to perform a reboot action for the electronic apparatus.

3. The electronic apparatus according to claim 2, wherein the flash memories are formed with a data sector, the data sector comprises a first data partition and a second data partition, the operating system is installed in the first data partition, the second data partition stores an operating system restoring file; when the operating system maintenance device receives the operating system repairing instruction, the microprocessor of the operating system maintenance device requests that the controller of the data storage device restores the operating system in the first data partition by the operating system restoring file in the second data partition; after the operating system has been repaired, the microprocessor of the operating system maintenance device sends the reset signal to the reset pin via the input and output pin to perform the reboot action for the electronic apparatus.

4. The electronic apparatus according to claim 3, the controller comprises a firmware, the firmware defines an operating system restoring process; when the operating system maintenance device receives the operating system repairing instruction, the microprocessor of the operating system maintenance device sends an operating system restoring instruction to the controller, the controller executes the operating system restoring process to restore the operating system in the first data partition by the operating system restoring file in the second data partition.

5. The electronic apparatus according to claim 3, wherein the first data partition further stores at least one specific data; when the operating system is operating normally, the controller will back up the specific data in the first data partition to the second data partition; afterwards, when the damaged operating system has been repaired, the controller copies the previously backed up specific data from the second data partition to the first data partition.

6. The electronic apparatus according to claim 1, wherein the microprocessor is a chip with network communication function, the network communication component is integrated in the microprocessor.

7. The electronic apparatus according to claim 1, further comprises a circuit board, the flash memories and the controller of the data storage device and the microprocessor and the network communication component of the operating system maintenance device are disposed on the circuit board.

8. The electronic apparatus according to claim 1, further comprises a first circuit board and a second circuit board, the flash memories and the controller of the data storage device are disposed on the first circuit board, and the microprocessor and the network communication component of the operating system maintenance device are disposed on the second circuit board.

9. The electronic apparatus according to claim 1, wherein the microprocessor of the operating system maintenance device is connected to the controller of the data storage device via a connection line conforming to RS232 specification, UART specification, or I2C specification.

10. The electronic apparatus according to claim 1, wherein the data storage device is a data storage device having a SATA transmission interface, a PCIe transmission interface or an M.2 transmission interface.

11. The electronic apparatus according to claim 1, wherein the network communication component is a WiFi communication component, an Ethernet communication component, or a 3G, 4G or 5G communication component.

12. A system capable of remotely maintaining the operation of electronic apparatus, comprising:
 a cloud management platform; and
 at least one electronic apparatus comprising a data storage device and an operating system maintenance device connected to the data storage device, wherein the data storage device comprises a plurality of flash memories and a controller, the controller is connected to the flash memories, the electronic apparatus is installed with an operating system via the flash memories, the operating system maintenance device comprises a microprocessor and a network communication component, the microprocessor is connected to the network communication component, the operating system maintenance device is connected to the cloud management platform via the network communication component;
 wherein, when the operating system of the electronic apparatus is abnormal, the operating system maintenance device receives an operating system repairing instruction from the cloud management platform via the network communication component, and the microprocessor of the operating system maintenance device executes a repairing task for the operating system according to the operating system repairing instruction;
 wherein the microprocessor of the operating system maintenance device is equipped with an embedded system used for monitoring an operation condition of the operating system; when the embedded system monitors that the operating system is abnormal, the microprocessor reports an operating system fault message to the cloud management platform, and then the cloud management platform transmits the operating system repairing instruction to the operating system maintenance device according to the operating system fault message.

13. The system according to claim 12, wherein the microprocessor further comprises an input and output pin, the electronic apparatus further comprises a motherboard that is provided with a reset pin thereon, the input and output pin is connected to a reset pin; when the operating system maintenance device receives the operating system repairing instruction, the microprocessor of the operating system maintenance device sends a reset signal to the reset pin via the input and output pin to perform a reboot action for the electronic apparatus.

14. The system according to claim 13, wherein the flash memories are formed with a data sector, the data sector comprises a first data partition and a second data partition, the operating system is installed in the first data partition, the second data partition stores an operating system restoring file; when the operating system maintenance device receives the operating system repairing instruction, the microprocessor of the operating system maintenance device requests that the controller of the data storage device restores the operating system in the first data partition by the operating system restoring file in the second data partition; after the operating system has been repaired, the microprocessor of the operating system maintenance device sends the reset signal to the reset pin via the input and output pin to perform the reboot action for the electronic apparatus.

15. The system according to claim 14, the controller comprises a firmware, the firmware defines an operating system restoring process; when the operating system maintenance device receives the operating system repairing instruction, the microprocessor of the operating system maintenance device sends an operating system restoring instruction to the controller, the controller executes the operating system restoring process to restore the operating system in the first data partition by the operating system restoring file in the second data partition.

16. The system according to claim 14, wherein the first data partition further stores at least one specific data; when the operating system is operating normally, the controller will back up the specific data in the first data partition to the second data partition; afterwards, when the damaged operating system has been repaired, the controller copies the previously backed up specific data from the second data partition to the first data partition.

17. A method capable of remotely maintaining the operation of electronic apparatus, which is applied to a system capable of remotely maintaining the operation of electronic apparatus, the system comprises a cloud management platform and at least one electronic apparatus, the electronic apparatus comprises a data storage device and an operating system maintenance device, the data storage device comprises a plurality of flash memories and a controller, the electronic apparatus is installed with an operating system via the flash memories of the data storage device, the operating system maintenance device comprises a microprocessor that is having a network communication function and equipped with an embedded system, steps of the method capable of remotely maintaining the operation of electronic apparatus comprising:
 requiring the operating system maintenance device to communicate with the cloud management platform;
 sending an operating system fault message to the cloud management platform by the microprocessor of the operating system maintenance device when the microprocessor of the operating system maintenance device monitors that the operating system of the electronic apparatus is abnormal;
 transmitting an operating system repairing instruction to the operating system maintenance device by the cloud management platform according to the operating system fault message; and
 executing a repairing process for the operating system of the electronic apparatus by the microprocessor of the operating system maintenance device after receiving the operating system repairing instruction from the cloud management platform.

18. The method according to claim 17, wherein the step of the microprocessor of the operating system maintenance device executing the repairing process for the operating system of the electronic apparatus comprising:
 sending a reset signal to a reset pin on a motherboard of the electronic apparatus to perform a reboot action for the electronic apparatus.

19. The method according to claim 17, wherein the flash memories are formed with a data sector, the data sector comprises a first data partition and a second data partition, the operating system is installed in the first data partition, the second data partition stores an operating system restoring file, the step of the microprocessor of the operating system maintenance device executing the repairing process for the operating system of the electronic apparatus comprising:

- requiring the controller of the data storage device to restore the operating system in the first data partition by the operating system restoring file in the second data partition; and
- sending a reset signal to a reset pin on a motherboard of the electronic apparatus to perform a reboot action for the electronic apparatus.

20. The method according to claim 19, wherein the step of requiring the controller of the data storage device to restore the operating system in the first data partition by the operating system restoring file in the second data partition comprising:

- sending an operating system restoring instruction to the controller by the microprocessor; and
- executing an operating system restoring process by the controller according to the operating system restoring instruction to restore the operating system in the first data partition by the operating system restoring file in the second data partition.

21. The method according to claim 19, wherein the first data partition further stores at least one specific data related with the operation of the operating system;

- when the operating system is operating normally, the controller will back up the specific data in the first data partition to the second data partition; afterwards, when the damaged operating system has been repaired, the controller copies the previously backed up specific data from the second data partition to the first data partition.

22. The method according to claim 17, further comprising the following steps:

- sending a firmware updating instruction including a firmware updating file to the operating system maintenance device by the cloud management platform; and
- updating a firmware of the controller of the data storage device after the microprocessor of the operating system maintenance device receiving the firmware updating instruction.

* * * * *